United States Patent [19]

Noguchi et al.

[11] Patent Number: 4,903,879
[45] Date of Patent: Feb. 27, 1990

[54] STATIONARY TAPE GUIDE FOR A MAGNETIC TAPE RECORDER

[75] Inventors: Yoshihiro Noguchi, Tokyo; Hideo Kitazawa, Komagane, both of Japan

[73] Assignees: Nakamichi Corporation, Kodaira; Kabusiki Kaisha Sankyo, Shimosuwa, both of Japan

[21] Appl. No.: 267,159

[22] Filed: Nov. 4, 1988

[30] Foreign Application Priority Data

Nov. 17, 1987 [JP] Japan ............................ 62-175168[U]

[51] Int. Cl.⁴ ............................................. G11B 11/665
[52] U.S. Cl. ................................ 226/199; 360/130.21
[58] Field of Search .................... 226/196, 197, 198; 242/76; 360/130.2, 130.21

[56] References Cited

U.S. PATENT DOCUMENTS

| | | | |
|---|---|---|---|
| 3,319,861 | 5/1967 | Molina et al. | 226/199 |
| 3,370,314 | 2/1968 | Morello | 226/199 X |
| 3,643,849 | 2/1972 | Roberts | 226/199 |
| 4,734,808 | 3/1988 | Kori | 360/130.2 |

FOREIGN PATENT DOCUMENTS

| | | | |
|---|---|---|---|
| 0171667 | 9/1985 | Japan | 360/130.21 |
| 60-253053 | 12/1985 | Japan . | |
| 0079268 | 4/1988 | Japan | 360/130.21 |
| 0103462 | 5/1988 | Japan | 360/130.21 |
| 0777732 | 11/1980 | U.S.S.R. | 226/199 |

OTHER PUBLICATIONS

IBM Technical Disclosure Bulletin vol. 14, No. 2, Jul. 1971, E. S. Johnson.

Primary Examiner—Donald Watkins
Attorney, Agent, or Firm—Klein & Vibber

[57] ABSTRACT

A stationary tape guide of the type comprising a guide block having, on its front face, a laterally extending guide path across a plurality of tape-face guides integrally formed on said block, at least a tape-edge guide having a guide surface extending from the guide block above the guide path for restricting lateral movement of the tape and means for securing said guide block in close proximity to a helical scanning cylinder of a magnetic tape recorder, wherein said tape-edge guide being formed as a detachable part from the guide block and slidably mounted on said guide block, bias means disposed between said tape-edge guide and said guide block for urging them away from each other, and means for adjusting the distance between said tape-edge guide and said guide block.

4 Claims, 7 Drawing Sheets

STATIONARY TAPE GUIDE FOR A MAGNETIC TAPE RECORDER

FIELD OF THE INVENTION

The present invention relates to an improvement in a stationary tape guide for a magnetic tape recorder, and more particularly relates to an improvement in a stationary tape guide to be disposed in close proximity to a cylinder having a rotary head.

BACKGROUND OF THE INVENTION

In a magnetic tape recorder which may store and reproduce information by helical scanning, it is common to provide a cylinder having a rotary head, inclining to a horizontal reference plane (for example, the top surface of a chassis) which is perpendicular to rotational axes of tap reels. When such a cylinder is utilized, a pair of tape pull-out means are required to pull out a tape from a tape cassette and to wind the tape around the cylinder surface for a predetermined angle.

In this connection, it has been known that when a tape is transferred by keeping the tape surfaces orthogonal to a reference plane and at the same time by keeping the tape edges parallel to the reference plane, and is contacted with a cylinder surface which is inclined to said reference plane, the orientation of the surfaces and edges of said tape with respect to the reference plane are varied.

There is a known tape pull-out means which has two guide pins, one is inclined and the other is oriented orthogonal to a reference plane, mounted on a carrier movable between a home position adjacent to a tape reel and a pulled-out position or a loading position adjacent to a cylinder. When a pair of such tape pull-out means are moved at both side of the cylinder, the inclined pins may change the orientation of the surfaces and edges of said tape with respect to the reference plane upstream and downstream of said cylinder so that tape surfaces which are orthogonal to said reference plane are changed into nonorthogonal (in upstream position) or vice versa (downstream) and that tape edges which are parallel to the reference plane are changed into nonparallel (upstream) or vice versa (downstream). When the pull out means are moved, however, the inclined guide pins are contacted with the tape surface and a force to move the tape in the direction of its width is generated. This force may cause a shift of the tape in the direction of its width (i.e. the axial direction of the inclined pin) and in result the movement of the tape away from the pins would occur resulting in the failure of pull out the tape.

A tape pull-out means having a plurality of inclined pins is disclosed in Japanese Unexamined Patent Application Gazette No. 60-253053. The use of a plurality of inclined pins necessitates accurate adjustment of relative inclination between the pins and the associated cylinder in manufacturing and installation. In order to reduce the troublesome adjustment of the relative inclination, it is proposed, in this reference, to form two inclined pins in one block.

However, the tape pull-out means having one or more inclined pins on a movable carrier has a defect to require accurate installation and positioning at their pulled out position, since inaccuracy in installation or positioning may result in inaccuracy in winding the tape on the inclined pin in a predetermined angle, which in turn results in inaccuracy of the angle of the tape surface against a reference plane and inaccuracy of the distance between the tape edges and the reference plane. This problem cannot be solved even if a guide block having one or more inclined pins are fixedly disposed with respect to a cylinder as a stationary guide, since inaccuracy of the pulled-out position of the pullout pin with respect to the stationary guide may result in inaccuracy of winding the tape on one of said inclined pins of the stationary guide in a predetermined angle.

The solution to this problem is disclosed in the U.S. patent application Ser. No. 154,265 filed on Feb. 10, 1988, now U.S. Pat. No. 4,875,126 by Niro Nakamichi. In this application, there is disclosed a stationary tape guide having a laterally extending guide path, the general contour of which is forwardly convexed, along which at least two straight guide projections inclined to said reference plane and a single straight guide projection extending orthogonal to said reference plane are serially and integrally provided on a guide block. In the preferred embodiments in said application, the tape guide is further provided with means for guiding an upper edge of a tape integrally or detachably therewith.

In the tape guide disclosed in the application, however, the edge guide means could not adjust the level of the edge guide surface with respect to the reference plane. When the securing means required for connecting the tape guide on a magnetic tape recorder is separately provided in addition to the securing means for connecting the detachable edge guide means or means for adjusting the level of the edge guide surface, the structure of the tape guide is too complicated and too large to conform to the requirment to minimize the size of a magnetic tape recorder.

SUMMARY OF THE INVENTION

Therefore, it is an object of the present invention to improve the stationary tape guide of the type which comprises a guide block having a plurality of tape-surface guides, at least a tape-edge guide extending from the guide block above the tape-face guide plane determined by the tape-face guides, and means for securing the tape guide with respect to an inclined cylinder.

In accordance with the present invention, the stationary tape guide is provided with at least a tape-edge guide, as a detachable part from the guide block, bias means disposed between said guide block and said edge guide for biasing said guide block and said edge guide to keep them apart from each other, a guide pin extending through said guide block, and screw means formed on said guide pin for connecting the edge guide means and said guide block and for adjusting their relative position, thereby the edge guide can be adjustably mounted on the guide block. In accordance with the present invention, means for adjusting tape-edge guide and means for securing tape guide block to a magnetic tape recorder are integrated into a single mechanism which in turn enables to achieve simplification and minimization of the tape guide.

BRIEF DESCRIPTION OF THE DRAWINGS

With these and other objects in view, which will become apparent in the following detailed description, the present invention, which is shown by example only, will be clearly understood in connection with the accompanying drawing, in which.

DETAILED DESCRIPTION OF PREFERRED EMBODIMENTS OF THE INVENTION

Figure 1:
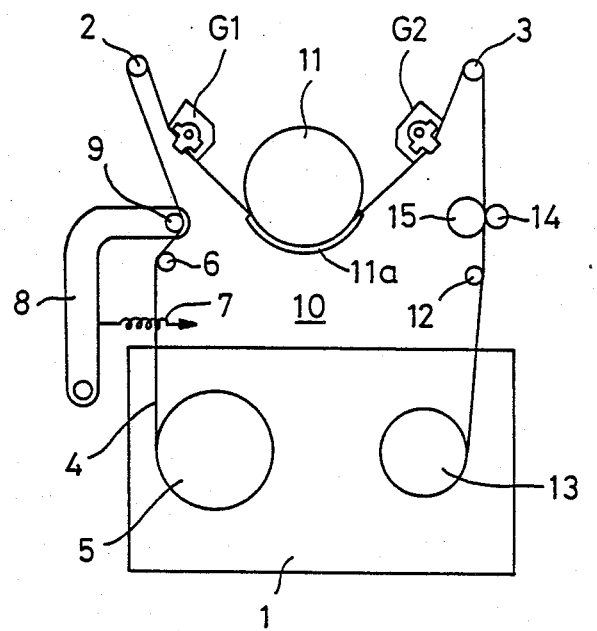
FIG. 1 generally shows a tape transferring path in a magnetic tape recorder in which a pair of stationary tape guides in accordance with the present invention are installed.

Referring to FIG. 1, there is shown a tape transferring path in a magnetic tape recorder in which a pair of tape guides G1 and G2 in accordance with the present invention are installed. Tape 4 which is pulled out of cassette 1 by a pair of pull-out pins 2 and 3 is led from reel 5 to stationary tape guide G1, which is fixed on a chassis or a reference plane 10, via guide rollers 6. Tension pole 9 is mounted on arm 8 biased with spring 7 for absorbing variations in tape tension. The stationary tape guide G1 contacts with the tape surface on which magnetic material is coated.

Tape 4 led from guide G1 is helically wound along a cylinder 11 which has a rotary head (not shown) and is inclined to the reference plane (or chassis) 10 at a predetermined angle. Cylinder 11 has a stationary lead 11a to guide the lower edge of tape 4.

Tape 4 is guided from cylinder 11 by stationary tape guide G2 and is led to reel 13 via pull-out pin 3 and guide roller 12. Capstan 14 and pinch roller 15 cooperate to transfer tape 4 along the path as described and shown in FIG. 1.

When tape 4 arrives at and leaves from cylinder 11, the tape surfaces are not orthogonal to reference plane 10 and the tape edges are not parallel thereto. Tape guide G1 orients the surfaces and edges of tape 4 which heretofore are kept orthogonal and parallel respectively to reference plane 10 into nonorthogonal and nonparallel, and tape guide G2 orients the surfaces and edges of tape 4 which are kept nonorthogonal and nonparallel to reference plane 10 back into orthogonal and parallel respectively.

Figure 2:
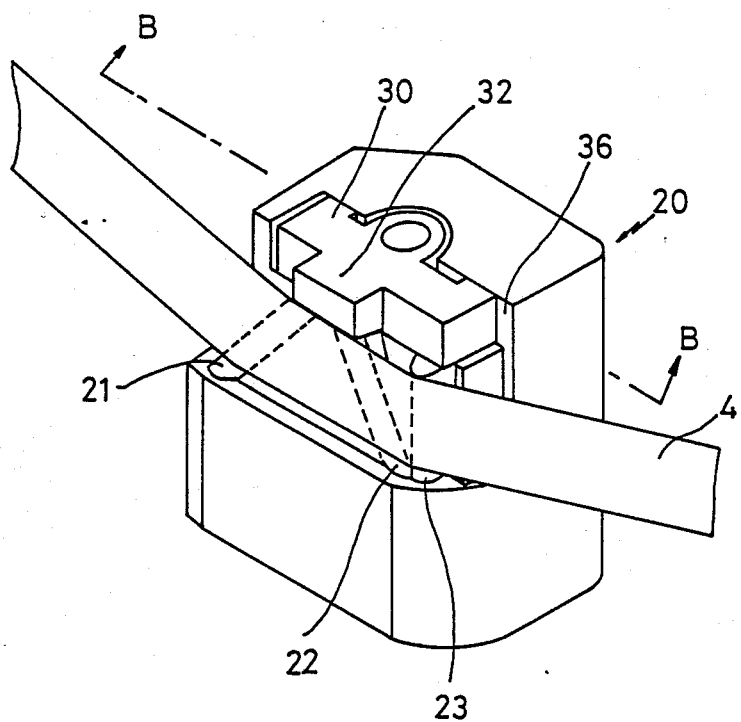
FIG. 2 is a perspective view of a stationary tape guide G2 to be disposed downstream of the cylinder in accordance with an embodiment of the present invention in which securing means are omitted.
Figure 3:
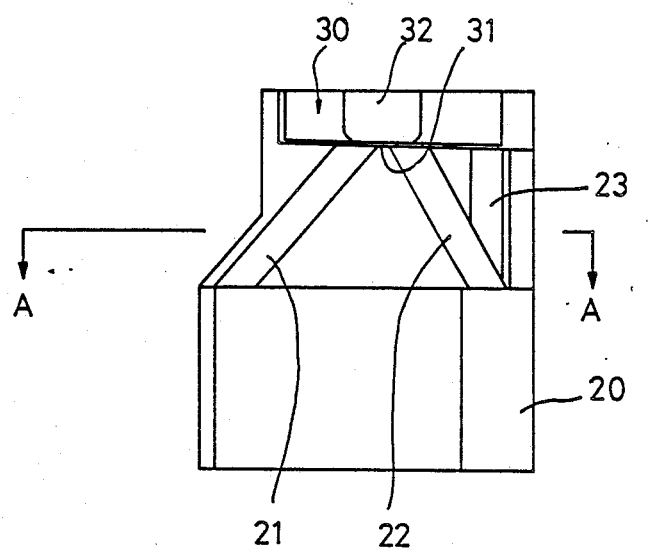
FIG. 3 is a front view of the embodiment of FIG. 2.
Figure 4:
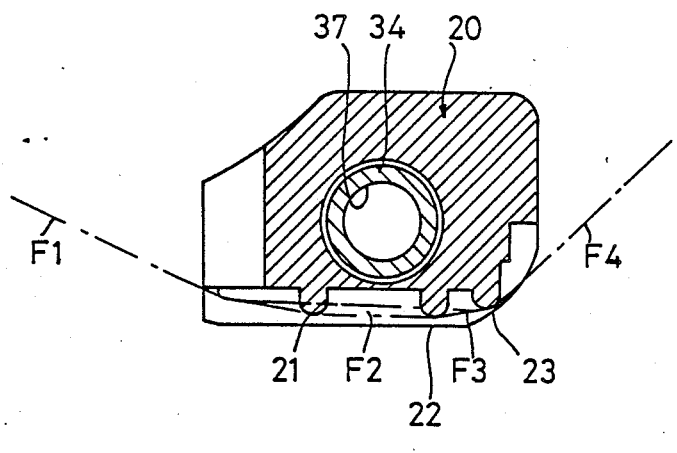
FIG. 4 is a cross section taken along the line A—A of FIG. 3.
Figure 5:
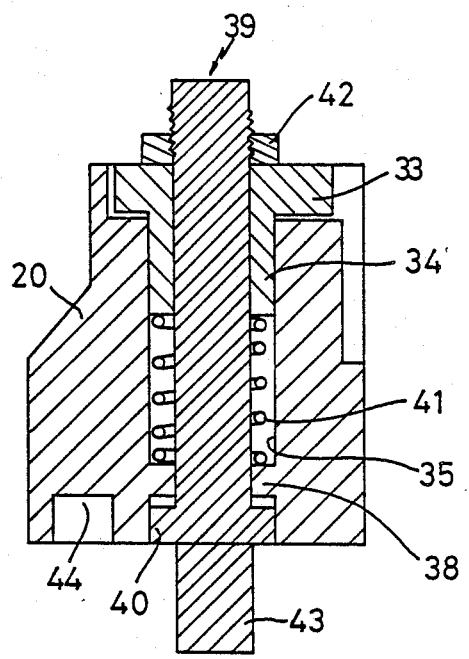
FIG. 5 is a cross section taken along the line B—B of FIG. 2.

FIG. 2 shows a perspective view of tape guide G2 disposed downstream of cylinder 11 of FIG. 1 in operation. In FIG. 2, securing means for connecting tape guide G2 to chassis 10 is omitted. FIGS. 3–5 show, respectively, a front view, a cross section taken along the line A—A FIG. 3, and a cross section taken along line B—B in FIG. 2 of an embodiment of tape guide G2 in accordance with the present invention.

Tape guide G2 comprises a guide block 20 on which a laterally extending guide path for tape 4 is provided. Along the guide path, first tape-face guide 21, second tape-face guide 22 and third tape-face guide 23 are serially and integrally formed. First–third tape-face guides 21–23 are shown as straight ridges each having semi-circular cross section (cf. FIG. 4). First and second tape-face guides 21 and 22 are oriented so as to incline to chassis 10 at predetermined angles respectively when tape guide G2 is secured to chassis 10. Third tape-face guide 23 is oriented orthogonal to reference plane 10 when tape guide G2 is secured to chassis 10.

With reference to FIG. 4, tape-face guide 21, to which tape 4 led from cylinder 11 first contacts, defines first guide plane F1 in cooperation with cylinder 11. Tape-face guides 21 and 22 define second guide plane F2. Second and third tape-face guides 22 and 23 define third guide plane F3. Third tape-face guide 23 defines fourth guide plane F4 in cooperation with pull-out pin 3. It should be noted that the edges of tape 4 located on guide planes F1 and F2 are nonparallel to chassis 10, and faces of tape 4 located on guide planes F1 and F2 are nonorthogonal to chassis 10. The edges and faces of tape 4 led from cylinder 11 are oriented back to parallel and orthogonal to chassis 10 on guide plane F3 via guide planes F1 and F2. The features described hereinabove are the same with those described in the aforementioned U. S. application by N. Nakamichi.

In accordance with the present invention, stationary tape guide G2 is provided with edge guide means 30 as a detachable part. Edge guide means 30 comprises a head portion 33 having a projection 32 and a cylindrical leg portion 34 extending from head 33. Projection 32 has on its bottom portion a tape-edge guide surface 31 to guide the upper edge of tape 4. When tape guide G2 is secured on chassis 10, edge-guide surface 31 faces to chassis 10 intervening with guide plane F2, and projecting beyond guide plane F2 to thereby prohibit tape 4 from shifting upward.

Edge-guide means 30 is provided with a through hole 37 extending through leg portion 34 and head portion 33 in the direction of the axis of leg portion 34. Leg portion 34 is slidably received in a bore 35 formed on guide block 20 to orient leg portion orthogonal to chassis 10 when tape guide G2 is secured to chassis 10. The rear surface of head portion 33 is guided along slide surface 36 of guide block 20. Bore 35 has a reduced diameter portion 38 in the proximity of its lower end. Guide pin 39 having enlarged diameter portion 40 in the vicinity of its lower end is inserted into through hole 35 from the lower end until the enlarged diameter portion 40 abut on the reduced diameter portion 38 of bore 35. Coil spring 41 is disposed between the lower end of leg portion 34 and reduced diameter portion 38 in bore 35. Nut 42 is screwed on the top of guide pin 39 in abutment with the top surface of head portion 33 and against biasing force of coil spring 41. Thus the distance between edge-guide surface 31 and chassis 10 can be adjusted.

When guide pin 39 is completely inserted into bore 35, the lower end 43 of guide pin 39 extends beyond the bottom surface of guide block 20. Lower end 43 is tightly fitted, for example, into a recess (not shown) formed on the chassis 10. Enlarged diameter portion 40 of guide pin 39 is slidably inserted into lower end of through hole 35. Guide block 20 is provided with a recess 44 on its bottom surface in the vicinity of through hole 35. Recess 44 tightly receives, for example, a projection (not shown) formed on chassis 10. Thus tape guide G2 can be accurately and definitely located and secured to chassis 10 with the cooperation of guide pin 39 and recess 44 together with corresponding recess (not shown) and projection (not shown). It will be understood that defininte and accurate location of tape guide G2 can be assured in different way, for example, by fitting of guide pin 39 and corresponding recess (not shown) formed on chassis 10 at a single point. More particularly, the cross-sectional contours of the enlarged portion 40 and lower portion 43 of guide pin 39 of FIG. 5 are deformed into nonsymmetrical shape and cross-sectional contours of lower end of through hole 35 and recess formed on chassis 10 are correspondingly deformed.

It should be also noted that the thickness of enlarged diameter portion 40 (i.e. the dimension of enlarged diameter portion 40 in the axial direction of guide pin 39) is slightly shorter than the depth or dimension from the bottom end of the guide block 20 to the lower surface of reduced diameter portion 38 of through hole 35 and that a small gap is formed between the upper surface of enlarged portion 40 and the lower surface of reduced diameter portion 38 when tape guide G2 is mounted on the chassis 10. This gap allows coil spring 41 to urge the bottom surface of guide block 20 to chassis 10 with its resiliency in securing the tape guide G2.

The structure of tape guide G1 is the same with the tape guide G2, except that the ridges or tape-face guides 21-23 are reversly arranged and tape-face guides 21 and 22 are reversly oriented in the shape V as compared with tape guide G2 in which tape-face guide 21 and 22 are arranged in the form of inverted V. More precisely, second guide plane F2 which is defined by tape-face guides 21 and 22 is inclined so that the upper edge of first guide plane F1 is forwardly shifted in tape guide G2, whereas second guide plane F2 of tape guide G1 is inclined so that the upper edge of plane F2 is backwardly shifted.

Figure 6:
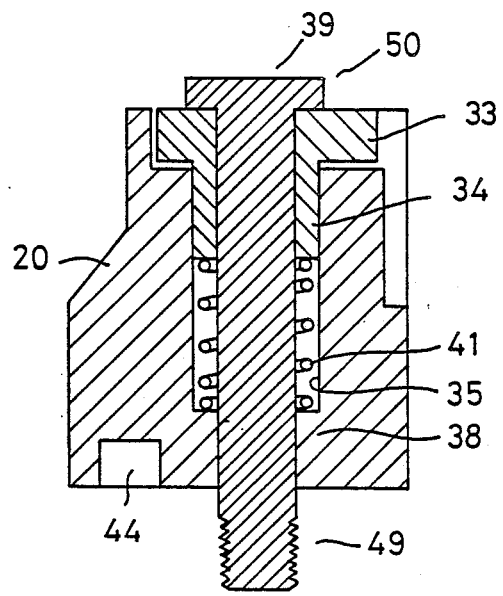
FIG. 6 is a cross section corresponding to FIG. 5 of a tape guide G2 in accordance with another embodiment of the present invention.

FIG. 6 shows a cross section of a tape guide G2 in accordance with another embodiment of the present invention, wherein guide pin 39 which has enlarged diameter portion 50 on its upper end and reduced diameter portion having screw portion 49 on its lower end to be screwed to chassis 10, is inserted into through hole 35 of guide block 20 and through hole 37 of edge guide member 30 in the same manner as shown in FIGS. 2-5. Compressed coil spring 41 is disposed between leg portion 34 and reduced diameter portion 38. When screw portion 49 of guide pin 39 is screwed into the screw hole of chassis 10, top surface of head portion 33 is pressed by enlarged portion 50 against biasing force of coil spring 41. Thus the level of edge guide surface 31 of edge guide member 30 can be adjusted by rotation of guide pin 39 along the through hole 35 with respect to guide block 20. Guide block 20 is also urged to chassis 10 by the biasing force of coil spring 41 and accurately secured in cooperation with the fitting arrangement of the recess 44 and the corresponding projection (not shown) of chassis 10. Other features of the tape guide G2 of FIG. 6 are the same with the embodiment shown in FIGS. 2-5, and are not described for simplicity, but like items are designated with like reference alphanumerics.

Figure 7:
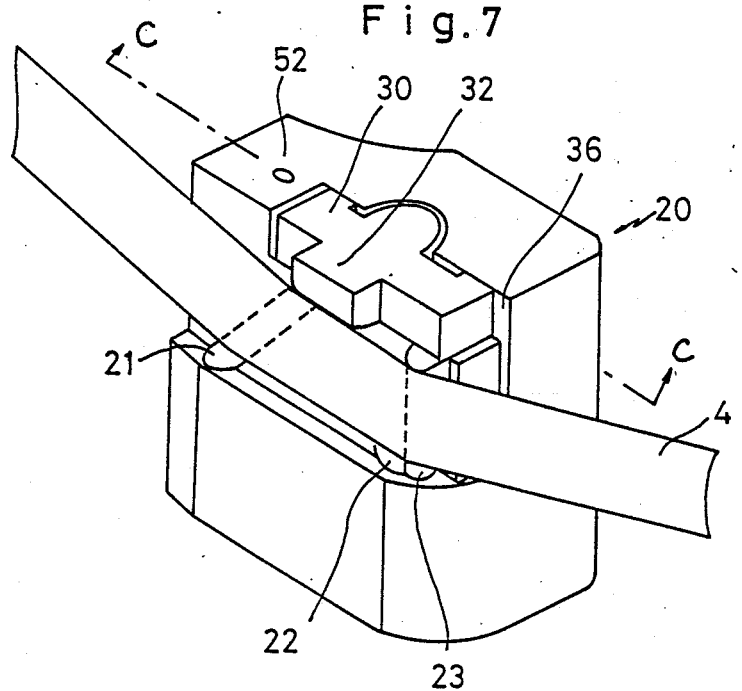
FIG. 7 is a perspective view of a tape guide G2 in accordance with a further embodiment of the present invention.
Figure 8:
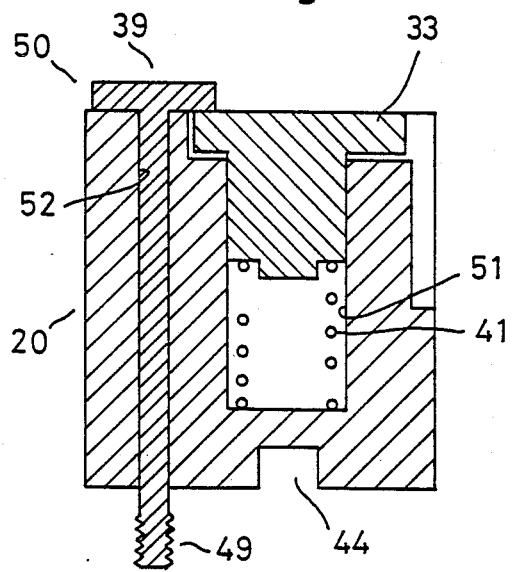
FIG. 8 is a cross section taken along the line C—C of FIG. 7.

FIG. 7 shows a perspective view of a tape guide G2 in accordance with another embodiment of the present invention, and FIG. 8 shows a cross section taken along the line C—C of FIG. 7. In FIG. 7, securing means for mounting tape guide G2 to chassis 10 are omitted.

In this embodiment, leg portion 34 of edge guide member 30 is inserted into a recess 51 formed on the upper surface of guide block 20, and a compressed coil spring 41 is disposed between the leg portion 34 and the bottom surface of the recess 51. Guide pin 39 which has a screw portion 49 to be screwed to chassis 10 is inserted into a through hole 52 formed in guide block 20. Head portion 33 of edge guide member 30 is urged to chassis 10 by the enlarged portion 50 of guide pin 39 against the biasing force of coil spring 41. Thus the level of the edge guide member 30 can be adjusted by rotation of guide pin 39 with respect to chassis 10. Guide block 20 is urged to chassis 10 by the resilient force of coil spring 41, and definitely located and secured to chassis 10 in cooperation with the recess 44 and the corresponding projection (not shown).

Other features of the tape guide G2 of FIGS. 7 and 8 are the same with the embodiment shown in FIGS. 2-5, and are not described for simplicity, but like items are designated with like reference alphanumerics.

Although the invention is described and illustrated with reference to a plurality of embodiments thereof, it is to be expressly understood that it is no way limited to the disclosure of such preferred embodiments but is capable of numerous modifications within the scope of the appended claims.

We claim:

1. A stationary tape guide of the type comprising a guide block having on its front face a laterally extending guide path across a plurality of tape-face guides integrally formed on said block, at least a tape-edge guide having a guide surface extending from the guide block above the guide path for restricting lateral movement of the tape and means for securing said guide block in close proximity to a helical scanning cylinder of a magnetic tape recorder, comprising said tape-edge guide being formed as a detachable part from the guide block and slidably mounted on said guide block;

means for adjusting the distance between said tape-edge guide and said guide block; and bias means disposed between said tape-edge guide and said guide block for urging said tape-edge guide to said adjusting means and for urging said guide block to chassis.

2. A stationary tape guide as set forth in claim 1, wherein:

said block is provided with a vertical through hole having a relatively enlarged diameter portion on its top end and a relatively small diameter portion on its bottom end;

said tape-edge guide comprises a head portion having the guide surface, a leg portion adopted to be slidably received in the relatively enlarged diameter portion of the through hole of said block and a hole extending through said head and leg portions;

said adjusting means comprises a bolt having a leg adopted to be inserted into the through hole of said block at its top end and to be screwed into a female screw on a magnetic tape recorder and a head adopted to depress the top surface of said tape-edge guide against urging force of said biasing means; and said biasing means is adopted to be disposed between the bottom end of the leg portion of said tape-edge guide and the reduced diameter portion of said through hole of the guide block.

3. A stationary tape guide as set forth in claim 1, wherein:

said block is provided with a vertical through hole having a reduced diameter portion in the vicinity of its bottom end;

said tape-edge guide comprises a head portion having the guide surface, a leg portion adopted to be slidably received in the relatively enlarged diameter portion of the through hole of said block at its top end and a hole extending through said head and leg portions;

said adjusting means comprises a bolt having a leg adopted to be inserted into and extend through the through hole of said block at its bottom end and having an enlarged diameter portion in the vicinity of its bottom end and a reduced diameter portion at its bottom end, said enlarged diameter portion of said bolt is adopted to be received in the through hole of said block at its bottom end and said reduced diameter portion is adopted to be secured to a magnetic tape recorder and a nut adopted to depress the top of said tape-edge guide against the urging force of said biasing means; and said biasing means is adopted to be disposed between the bottom end of the leg portion of said tape-edge guide and the reduced diameter portion of said through hole of the guide block.

4. A stationary tape guide as set forth in claim 1, wherein:

said block is provided with a vertical through hole and a resess on its top surface;

said tape-edge guide comprises a head portion having the guide surface and a leg portion adopted to be slidably received in the resess of said block;

said biasing means is adopted to be disposed between the bottom end of the leg portion of said tape-edge guide and the bottom of the resess of said block; and said adjusting means comprises a bolt having a leg adopted to be inserted into the through hole of said block at its top end and to be screwed into a female screw on a magnetic tape recorder and a head adopted to depress the top surface of said tape-edge guide against urging force of said biasing means.

* * * * *